July 22, 1969  R. J. MAHONEY ET AL  3,456,811
MACHINE FOR UNLOADING TRAY SUPPORTED ARTICLES
Filed Oct. 2, 1967  6 Sheets-Sheet 3
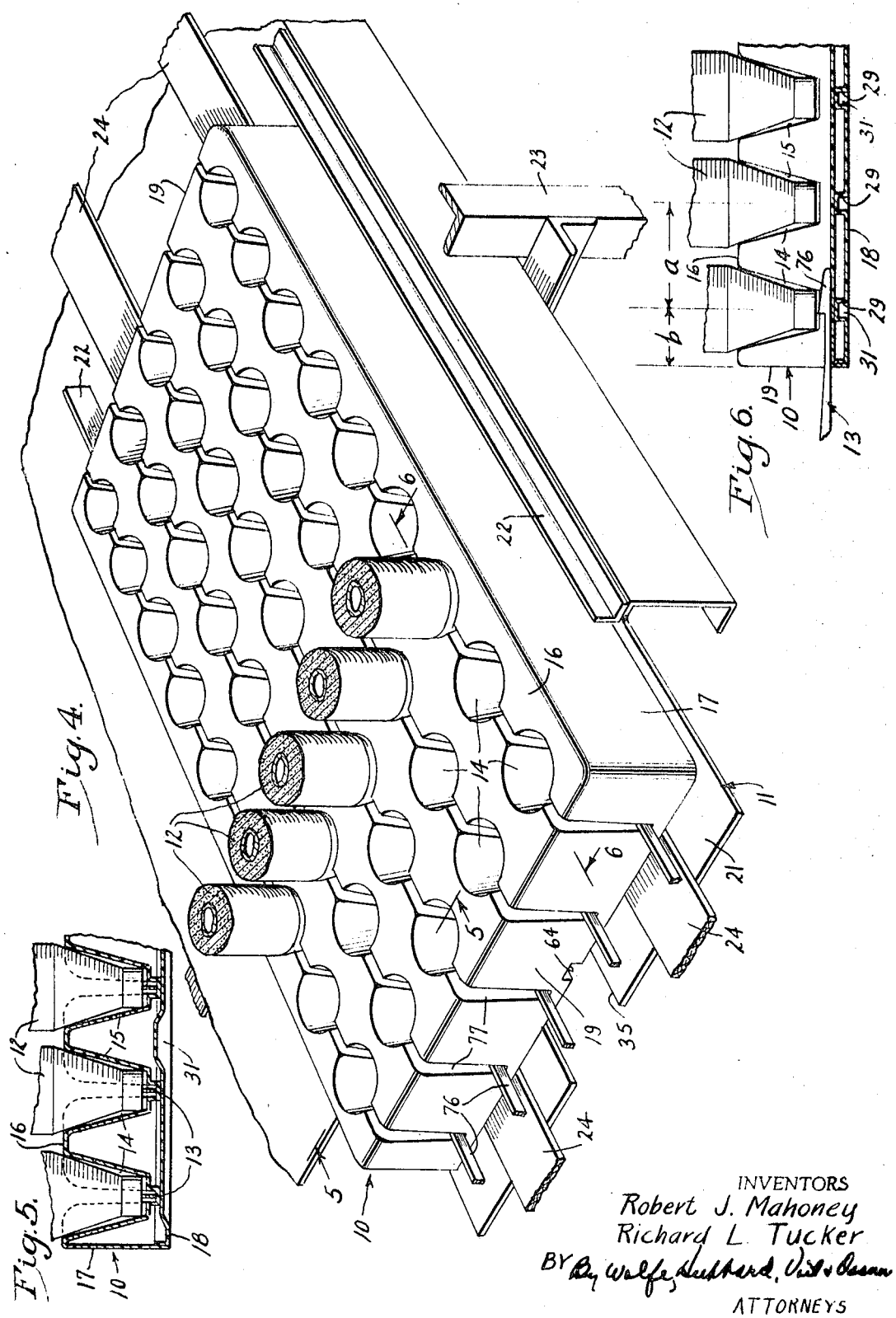
INVENTORS
Robert J. Mahoney
Richard L. Tucker
BY
ATTORNEYS July 22, 1969     R. J. MAHONEY ETAL     3,456,811
MACHINE FOR UNLOADING TRAY SUPPORTED ARTICLES
Filed Oct. 2, 1967     6 Sheets-Sheet 4
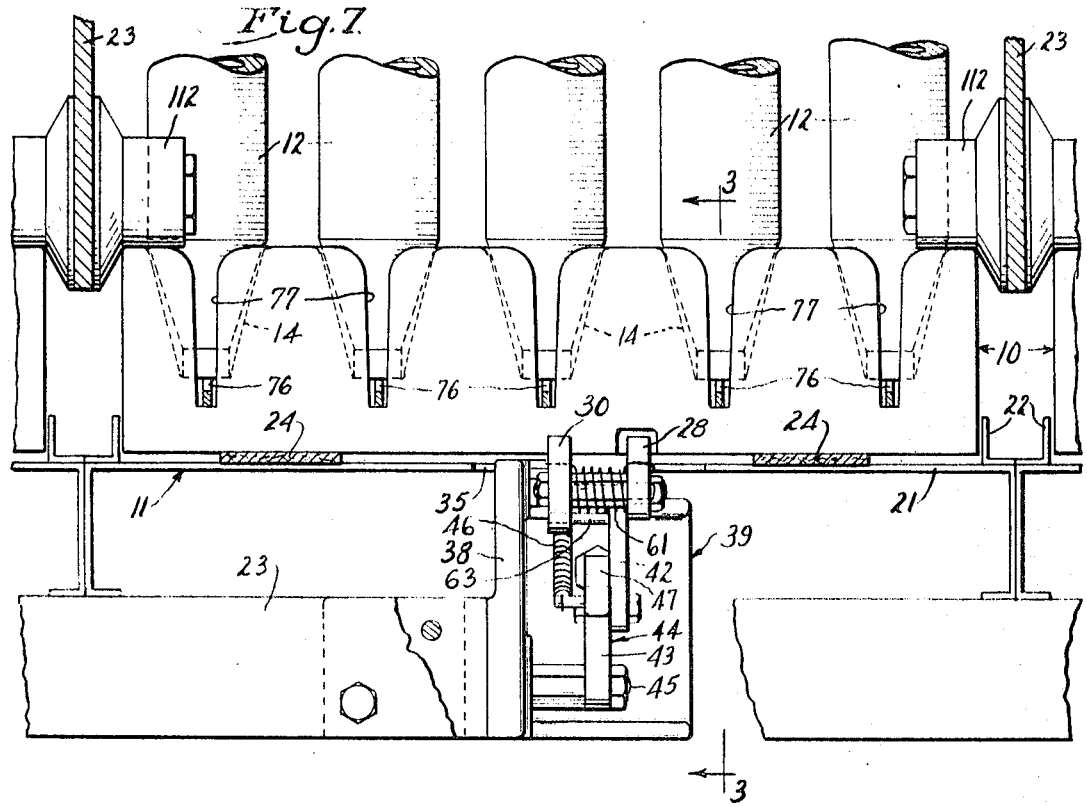
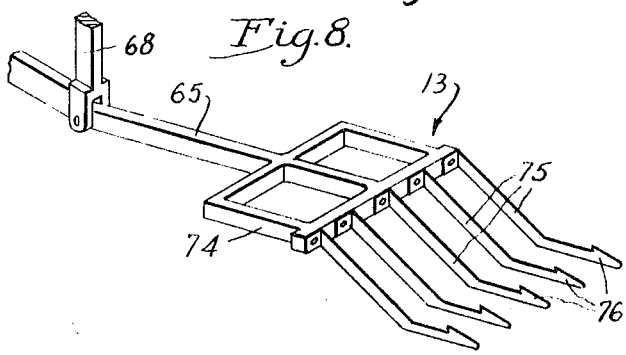
INVENTORS
Robert J. Mahoney
Richard L. Tucker
ATTORNEYS

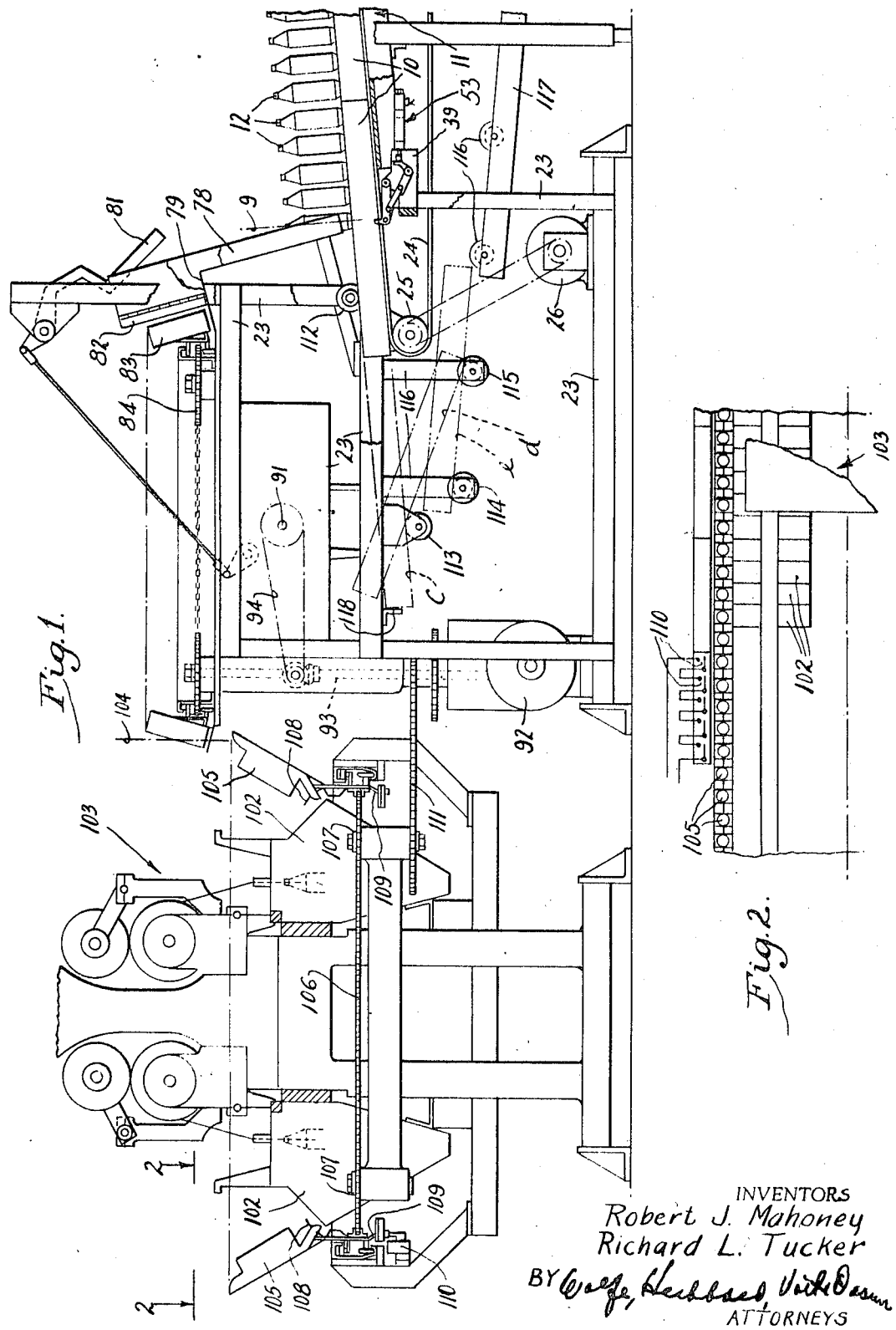

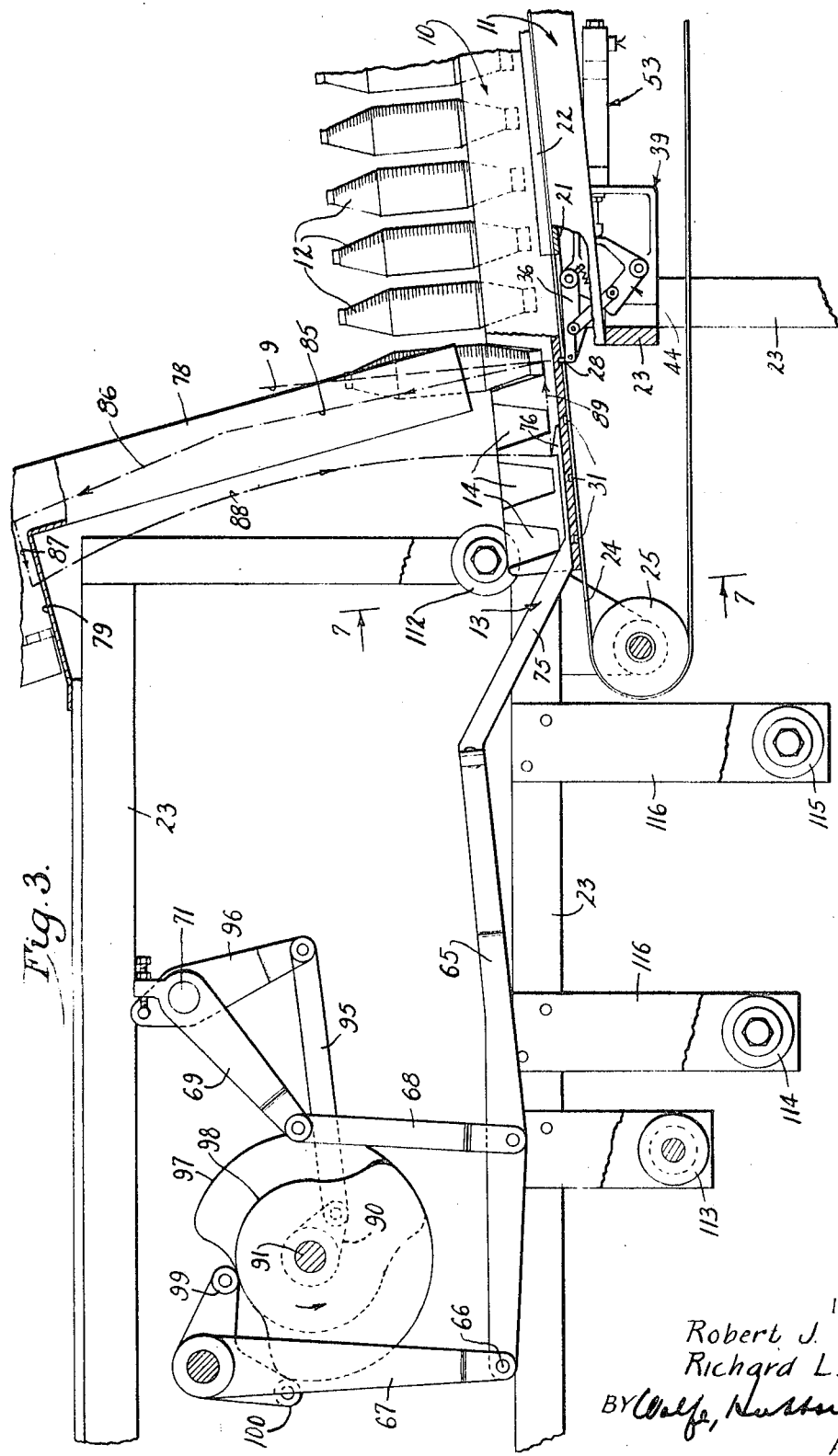

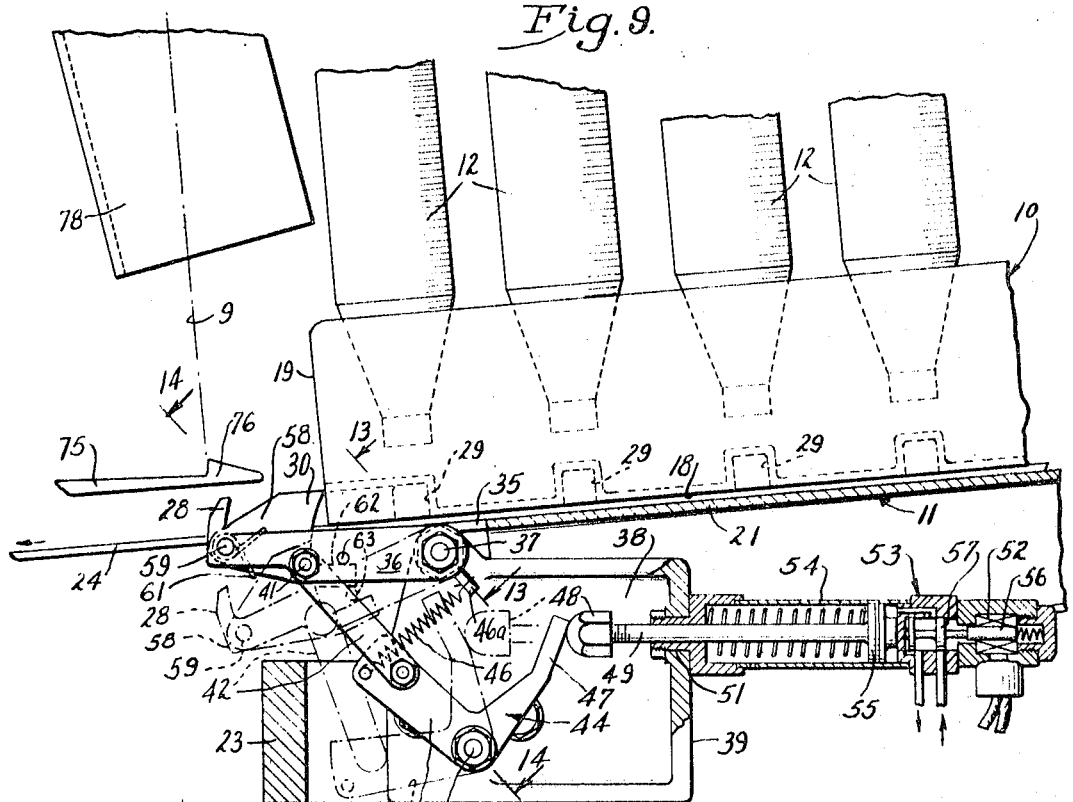

INVENTORS
Robert J. Mahoney
Richard L. Tucker
ATTORNEYS

United States Patent Office 3,456,811
Patented July 22, 1969

3,456,811
MACHINE FOR UNLOADING TRAY SUPPORTED ARTICLES
Robert J. Mahoney and Richard L. Tucker, Rockford, Ill., assignors to Barber-Colman Company, Rockford, Ill., a corporation of Illinois
Filed Oct. 2, 1967, Ser. No. 672,052
Int. Cl. B25j 3/04
U.S. Cl. 214—1                8 Claims

ABSTRACT OF THE DISCLOSURE

Articles such as bobbins standing on end are arranged in parallel longitudinally and transversely extending rows in a tray which is biased continuously down an inclined chute to present each successive transverse row to an unloading position from which the bobbins are elevated out of the tray by the fingers of a fork continuously traversing an upright orbital path. Stops engageable with the bottom of the leading tray in the chute are retracted at random times and in timed relation to the motion of the fork so as to allow the tray to advance one step and present the leading row of the remaining bobbins to the unloading position.

Background of the invention

Articles such as bobbins arranged in parallel longitudinally and transversely extending rows in a horizontal tray have been elevated row by row out of a tray which is biased forwardly in its supporting chute and allowed to advance step by step to present the next leading transverse row of the bobbins to an unloading position. Elevation of such bobbins is effected during the upstroke of a fork having fingers insertable endwise beneath the butts of the bobbins in the unloading position. Heretofore, each step of advance of the tray has been limited by engagement of the yarn masses of the leading bobbins with stationary stops thus necessitating the provision of additional mechanism for disengaging the bobbins from the stop before starting elevation by the fork.

Summary of the invention

The present invention provides a machine for unloading groups of articles such as bobbins from a tray of the above character and in which the advance of the tray step by step and intermittently is controlled by the successive engagement of the tray directly with a novelly arranged and controlled stop which is retractible in timed relation to the movement of a fork for elevating successive rows of the articles out of an unloading position to which the leading row of the articles is presented by forward indexing of the tray each time the stop is retracted. In a more specific aspect, the invention involves the use of two tray-engaging stops, one limiting the initial advance of the tray along its supporting conveyor toward the unloading position and the other engaging abutments spaced along the tray to locate the successive transverse rows in the unloading position.

Brief description of the drawings

FIG. 1 is a fragmentary vertical sectional view of a bobbin handling machine including a tray unloading mechanism embodying the novel features of the present invention.

FIG. 2 is a schematic plan view taken substantially along the line 2—2 of FIG. 1.

FIG. 3 is a fragmentary view of a portion of FIG. 1, the section being taken substantially along the line 3—3 of FIG. 7.

FIG. 4 is a fragmentary perspective view of the bobbin tray and its supporting conveyor.

FIGS. 5 and 6 are fragmentary views taken respectively along the lines 5—5 and 6—6 of FIG. 4.

FIG. 7 is a fragmentary section taken along the line 7—7 of FIG. 3.

FIG. 8 is a fragmentary perspective view of the bobbin elevating fork.

FIGS. 9 and 10 are fragmentary section enlargements of a portion of FIG. 3 showing different positions of the parts.

Description of the preferred embodiment

Figure 11:
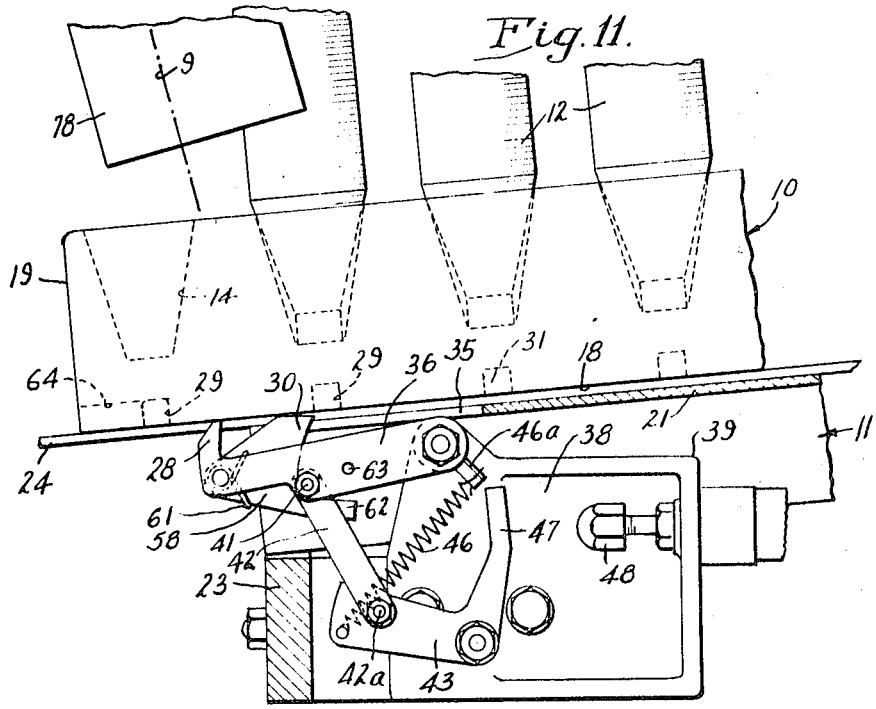
FIG. 11 is a view similar to FIG. 10 showing a different position.

In the drawings, the invention is shown for purposes of illustration incorporated in a machine for controlling the forward indexing of a carrier or tray 10 along a supporting conveyor 11 to present successive transverse rows of bobbins 12 therein to an unloading position 9 (FIGS. 1 and 3) from which the bobbins are elevated out of the tray in the next upward stroke of a continuously reciprocated fork 13. The tray in the form shown (see FIGS. 4, 5 and 6) comprises a rigid generally rectangular body of molded plastic material having upwardly opening recesses or cups 14 substantially shallower than the lengths of the bobbins and formed with downwardly converging walls 15 in which the butt end of a bobbin dropped endwise into the recesses becomes seated in upright position as shown in FIGS. 4 and 6. The recesses are arranged to support a plurality of the bobbins in parallel rows extending longitudinally of the tray, the corresponding bobbins of such rows being disposed in rows extending transversely of the tray. The cups open upwardly from a top wall 16 from which depends a peripheral skirt 17 of rectangular shape joined at its lower edge by a flat bottom 18 spaced below the bottoms of the cups. The cups 14 of the transverse rows in each tray are spaced apart equal distances $a$ (FIG. 6) and the leading and trailing end walls 19 of the skirt 17 are spaced from the axes of the bobbins in the next adjacent cups a distance $b$ which is one half of $a$. Thus, with trays arranged in end to end abutment as shown in FIG. 1, the bobbins in the adjacent end rows are spaced apart the same distance $a$ as the bobbins in adjacent rows of each tray.

Preferably the conveyor 11 for supporting the tray and guiding the same in its endwise movement toward and past the bobbin unloading position 9 takes the form of a chute comprising a flat plate 21 supported by a box-like frame structure 23 and having parallel side walls 22 upstanding along opposite sides of the supported trays, the plate being inclined downwardly at a small angle to induce forward tipping of the supported bobbins. To continuously bias the tray forwardly, the lower edge of the skirt rests on flat endless belts 24 laterally spaced apart across and lying against the top of the plate 21 and extending around pulleys 25 which are driven by a motor 26 (FIG. 1) to advance the upper runs of the belts downwardly along the plate, usually at the rate of several feet a minute, and thus bias the tray forward continuously.

In accordance with the present invention, the step by step advance of the tray down the chute and the location of the successive transverse rows of bobbins in the loading position 9 is controlled by a main stop 28 continuously urged upwardly for engagement with upright abutments 29 extending transversely of and spaced along the bottom of the tray in accordance with spacing of the rows of cups. In another aspect, the invention contemplates limiting the initial advance of a tray, after being loaded into the chute 11, by engagement of the leading end 19 with a second upwardly biased stop 30 which, when retracted, releases the tray for control by the main stop and then remains inactive during the advance of the tray to present the successive transverse rows to the unloading position.

Figure 12:
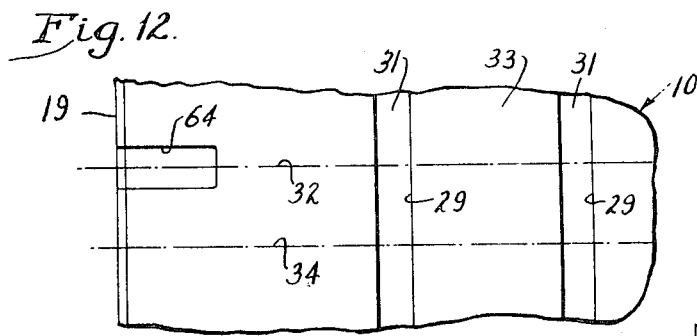
FIG. 12 is a fragmentary bottom view of the bobbin tray.
Figure 14:
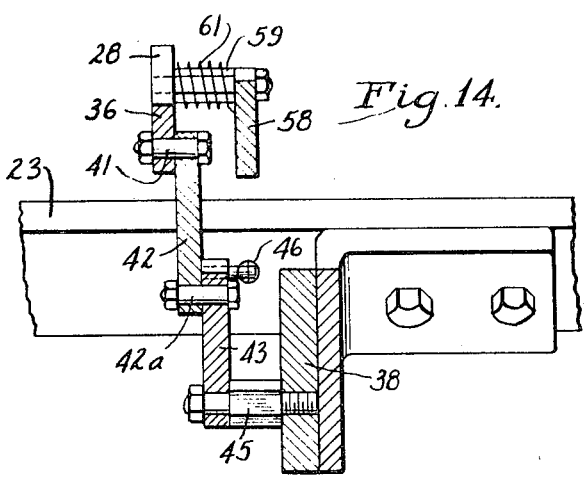
FIGS. 13 and 14 are fragmentary sections taken along the lines 13—13 and 14—14 of FIG. 9.
Figure 13:
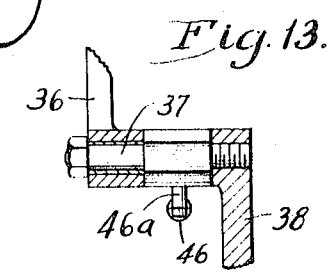

Herein, the abutments 29 comprise the trailing walls of notches 31 formed in the tray bottom 18 and extending transversely thereof, each notch being wide enough to permit entry of the stop 28 therein. Between the leading tray end 19 and the first notch 31 and between adjacent notches along the tray to the trailing end wall thereof, the upper end of the stop 28 is engageable, along a line 32 (FIG. 12), with a flat area 33 constituting the bottom surfaces of the tray and substantially flush with the lower edge of the skirt 17. Similarly, the secondary stop 30, after being retracted below the leading end wall 19 of the tray, engages the surface 33 along a line 34 (FIG. 12) and extending along the full length of the tray bottom.

Herein the main stop 28 takes the form of a lug upstanding through a longitudinal slot 35 in the plate 21 substantially at right angles from the free end of an arm 36 projecting generally horizontally beneath the plate 21 and downwardly along the chute from a pivot formed by a stud 37 which projects transversely of the chute from one side wall 38 of a casing 39 fixed to the frame 23 beneath the plate. About midway between its ends, the arm is joined by a pivot pin 41 to the upper end of a link 42 whose lower end is pivotally connected by a pin 42a to one upwardly extending arm 43 of a V-shaped bell-crank 44 fulcrumed at its apex on a stud 45 projecting from the casing wall 38. The arm 43 and the link 42 form a toggle which is straightened as shown in FIGS. 9 and 10 by clockwise swinging of the bell-crank under the action of a contractile spring 46 stretched between the arm 43 and the lug 46a on the stud 37 rigid with the casing.

Such straightening of the toggle and upward swinging of the stop arm 36 by the spring is limited by engagement of the second upright arm 47 of the bell-crank with a head 48 on the end of a rod 49 slidable in a horizontal guide 51 on the end of the casing 39 and biased to retracted position (FIGS. 9 and 10) under the force of the spring 46. To lower the stop 28 and permit the tray to advance, the rod 49 is projected forwardly to the position shown in phantom in FIG. 9 and in response to energization of a solenoid 52. Preferably, the solenoid acts through the medium of a fluid pressure actuator 53 comprising a cylinder 54 fixed to the casing 39 and a piston 55 slidable therein and fixed to the rod and engageable with the head end of the cylinder to limit the retraction of the rod. The armature 56 of the solenoid actuates a valve 57 for respectively admitting pressure fluid to and releasing the same from the head end of the cylinder in response to energization of the solenoid and spring retraction of the armature to normal position when the solenoid is deenergized. Valves of this character usually include an internal spring which retracts the piston rod when the solenoid is deenergized.

The other stop 30 is formed by the end of one arm of a bell-crank lever 58 fulcrumed on a stud 59 projecting from the side of the stop arm 36 near the free end thereof and continuously urged upwardly and counterclockwise as viewed in FIG. 9 by a torsion spring 61 coiled around the stud. The bell-crank 58 is generally U-shaped with the arm projecting upwardly along the tray chute and a second arm 62 engaging a stop pin 63 on the stop arm 36 to limit the upward swinging of the stop 30 to the position shown in FIG. 9. This stop is spaced upwardly along the chute from the main stop 28 a distance $b$ equal to one-half the spacing $a$ of the transverse rows of bobbins in the tray plus one-half the width of the notch 31.

Assuming that the chute is empty, the stops 28 and 30 will be swung upwardly by the springs 46 and 61 to the positions shown in FIG. 9, the actuator rod 49 being retracted. When a tray loaded with bobbins is deposited onto the chute, its downward advance is interrupted when the end wall 19 comes against the stop 30 as shown in FIG. 9. The stop 28, although raised above the bottom of the tray, remains inactive. At this time, this stop is disposed in the vertical plane of a slot 64 (FIGS. 4 and 10) opening through the tray walls 19 and extending through the tray bottom to the first of the abutments 29 that terminate the successive indexing movements of the tray.

Now, when the solenoid 52 is energized for a short interval, the rod 49 is projected forwardly thus rocking the bell-crank counterclockwise. The toggle 42, 43 is thus flexed to the position shown in phantom in FIG. 9 so as to retract both of the stops 28 and 30 below the bottom of the tray. With the stop 30 retracted below the end wall 19, the tray starts to move down the chute under the biasing force applied by the belts. The energization of the solenoid being only momentary, the rod 49 is retracted by the release of fluid from the cylinder 54, the stops being released to the action of the springs. The stop 30 thus comes against the bottom surface 33 of the tray while the stop 28 is raised to its upper limit and becomes alined with the slot 64. As the advance of the tray continues, the stop 28 enters the slot and engages the first abutment 29 as the tray reaches the position shown in FIG. 10 in which the first transverse row of bobbins is disposed in the unloading position 9. The stop 30 remains below the tray bottom and against the bottom surface 33.

The next time the solenoid is energized momentarily, both stops 30 and 28 are again lowered to the position shown in phantom in FIG. 9, the lowering of the stop 28 below the abutment 29 releasing the tray for further downward advance. Then, when the solenoid is deenergized before the next abutment reaches the stop 28, the arm 36 swings upwardly and the stops come against the bottom surface 33 as shown in FIG. 11.

When the first notch 31 is presented to the stop 28, the arm 36 swings upwardly to dispose the stop in the path of the second abutment 29 or trailing wall of this notch. The advance of the tray is arrested when this abutment engages the stop, the second transverse row of cups and bobbins thus being disposed in the unloading position.

The indexing of the tray as above described continues until all of the rows of cups have been presented to the unloading position. The same action continues when a second tray is disposed in the chute with its leading wall 19 in abutment with the trailing wall of the preceding tray as shown in FIG. 1. In this case, the abutting walls ride over the depressed stop 30 without active engagement thereof with the leading wall 19 of the second tray. The advance of the latter is arrested when the first of its abutments 29 reaches the stop 28, the first row of bobbins therein then being disposed in the unloading position 9.

The fork 13 for elevating the leading row of bobbins out of the tray may be constructed and actuated as fully disclosed in an application of Richard D. Livingston, Ser. No. 477,864, now U.S. Patent No. 3,368,766, filed Aug. 6, 1965, which application also discloses one way of effecting and timing the momentary energization of the solenoid 52. As shown in FIGS. 3 and 8, the fork includes a horizontal shank 65 pivoted at 66 to the lower end of an arm 67 and suspended intermediate its ends through a link 68 from the free end of an arm 69 which is fast on a rockshaft 71 on the frame 23.

The fork proper comprises a head 74 at the forward end of the shank and supporting fingers 75 which project from and are inclined downwardly from the head and then horizontally to shouldered ends 76 for engaging the butts of the bobbins in the unloading position and raising the bobbins out of their cups as the fork is raised. In the advance of the lowered fork, the fingers enter or are advanced through slots 77 (FIGS. 4 and 7) opening upwardly through the center planes of the cups 14 from below the butts of the bobbins supported therein. By virtue of the downwardly inclined parts 75 of the fork fingers, the head 74 of the fork remains disposed above the top of each advancing tray so that the fingers are adapted to pick up the leading row of bobbins from the unloading position in all positions of the tray along the chute 11.

In reaching the unloading position 9, the bobbins of the leading row become disposed in upwardly and forwardly inclined channels 78 along which the bobbins are guided while being elevated by the fork above the level of a ledge 79 (FIG. 1), the fingers 76 moving through upright slots in the bottoms of the channels. A pusher 81 driven in synchronism with the fork shifts the elevated group of bobbins across the ledge through upright gates 82 and into the pockets 83 of an endless conveyor 84.

Such elevation of the bobbins from the unloading position 9 while supported in the tray cups is effected in the movement of the ends 76 of the fork fingers upwardly along a part 85 of the orbital path 86 shown in dot-dash lines in FIG. 3 along which the fork fingers travel. At the upper end of the path 85, the fingers are retracted along a path 87 to assist in drawing the bobbin butts across the ledge 79 after which the retracted fork is lowered along a path 88 to a position below the bobbins in the unloading position. To complete its orbit, the fork is advanced endwise along a path 89 thus inserting the fingers along the slots 77 to position the ends 76 beneath the butts of the bobbins then in the unloading position as shown in FIG. 3.

The up and down movements 85 and 88 of the fork are effected by a crank 90 fast on the shaft 91 which is driven continuously by a motor 92 (FIG. 1) through appropriate speed reducing means, an upright shaft 93 and a chain 94. Through a link 95 (FIG. 3) and cranks 96 and 69, the crank 90 is coupled to the upright link 68 above described.

Advance of the fork horizontally along the path 89 and the position shown in FIG. 3 to insert the fingers beneath the bobbins in the unloading position and retraction of the fork along the path 87 is effected by cams 97 and 98 acting on followers 99 and 100. These cams are fast on the shaft 91 and shaped to define the desired orbital path of the elevating fork.

Provision is made for retracting the stops 28, 30 at random times but always in synchronism with the motion of the fork 13 so that whenever a row of bobbins is to be unloaded during the next upward stroke 85 of the fork, the tray will be released and advanced one step so as to present the leading transverse row of bobbins to the unloading position 9 by the time that the fork reaches its lowermost position and is advanced horizontally to project the end 76 of the fingers along the tray slots and to positions beneath the butts of the bobbins in the loading position as shown in FIG. 10.

The bobbin tray unloading mechanism above described is especially adapted for use with the machine disclosed in the above mentioned application which operates to convey the bobbins unloaded from the tray 10 past reserve pockets 102 (FIG. 1) of a multiple unit winder 103 and deposit such bobbins one by one into those pockets which are empty. As fully disclosed in said application, the groups of bobbins elevated onto the ledge 79 by the fork are moved by the pusher 81 into the pockets 83 of the conveyor 84 and dropped one by one from the latter when reaching an unloading position 104. These bobbins are received in passing cars 105 upstanding from and spaced along an endless conveyor 106 supported by sprockets 107 and extending around the winder to carry the cars past the reserve pockets thereof. When a filled car reaches an empty pocket, a gate 108 forming the bottom of the car is retracted to release the bobbin into the car. A lever 109 supporting the gate becomes latched in the released position of the gate and in such position is adapted, as it passes by, to close each of five switches 110 (FIG. 2) spaced along the conveyor path and connected in series in the circuit for energizing the tray release solenoid 52. Thus, when all of the switches are closed simultaneously by the latched lever 109 of five passing empty cars, the need for unloading another group of bobbins from the tray is given and the solenoid 52 is energized to initiate a bobbin unloading cycle, the first step of which is to advance the tray to present the next row to the unloading position for picking up by the fork in the next upstroke 85 thereof. The duration of switch closure is only momentary but nevertheless long enough for the tray to be released from the stops 28 and 30 and start to advance down the chute 11. For the same reason, the solenoid is deenergized before the next abutment 29 on the tray reaches the then active stop 28 thus interrupting the tray advance afer one step to dispose the next row of bobbins in the unloading position 9.

Such release of the tray, although occurring at random times, is effected in precise synchronism with the motion of the continuously reciprocated fork 13. For this purpose, the sprockets 107 of the conveyor 106 are driven through a chain 111 and meshing sprockets from the motor driven shaft 93 and coupled as above described to the camshaft 91 by which the fork is reciprocated. By locating the control switches 110 properly along the path of the conveyor 106, it will be apparent that the signal for energizing the solenoid 52 may be given at any desired point in the motion of the fork after the butts of the bobbins being elevated out of the tray have been raised above the tops of the bobbins of the row next to be advanced to the unloading position 9. The switches are arranged to be closed during the downward stroke 88 of the fork and long enough before the fork starts its upward stroke so as to allow for the leading row of bobbins to reach the unloading position after retraction of the stops by energization of the solenoid.

After the leading tray in the chute has been emptied and its last abutment 29 passes the stop 28, the trailing end portion thereof will still engage the belts 24 and therefore will be advanced thereby on ahead of the following tray and beneath rollers 112 (FIGS. 1, 3 and 7) supported by the frame 23 on opposite sides of the chute 11 and spaced upwardly along the chute a short distance from the drive roll 25 of the belts. These hold-down rolls maintain the position of the tray after the latter has advanced more than half way past the drive roll. Before the trailing end of the tray has passed these rollers, the leading end will have advanced onto and be supported by rollers 113 (FIG. 1) similarly mounted on the frame 23. Below and between the rollers 113 and the belt drive roll 25 are two pairs of similarly spaced rollers 114 and 115 which are suspended at 116 from the frame 23 and vertically spaced to receive and support the empty tray in the position e shown in FIG. 1, the tray then being inclined downwardly and reversely of the inclination of the chute. The inclination is sufficient to induce endwise gravitation of the tray reversely beneath the chute 11 and onto pairs of rollers 116 spaced along a chute 117 of the same construction as the chute 11.

It will be apparent that when the trailing end of an empty tray passes beyond the hold-down roller 112, the tray will be supported at opposite ends by the rollers 113 and the drive roll 25. As the belts continue the advance of the tray off from the drive roll, the leading end will engage a stop 118 and be positioned as shown at c in FIG. 1. Then, under the weight of the trailing end portion overhanging the rollers 113, the tray will tip downwardly to the inclined position indicated at d and become supported by the rollers 113 and 115. At this inclination, the tray is induced to gravitate reversely and off from the rollers 113. When this ocurs, the tray swings down to the position c and becomes supported at a lesser inclination by the rollers 114 and 115. This inclination is sufficient to induce reverse gravitation of the tray onto the rolls of the chute 117 thus continuing the return of the empty tray beneath the main chute 11 to a convenient point of removal.

We claim:

1. A machine for unloading successive transverse rows of articles from a carrier in which the articles are supported in upright positions and arranged in parallel longitudinally and transversely extending rows, means supporting said carrier substantially horizontally for indexing along a predetermined path and biasing the same forwardly along such path toward a predetermined unloading position, a first retractible stop biased into said path to an active position for engaging the leading end of said carrier to limit the advance thereof after loading onto said supporting means, a second retractible stop biased into said path, abutments spaced along the said carrier according to the longitudinal spacing of the transverse rows of articles therein, each abutment being positioned for engagement with said second stop after a predetermined advance of the carrier following retraction of the first stop out of engagement with said carrier end or said second stop out of engagement with a preceding one of said abutments, and means supporting said first and second stops and adapted when actuated to retract the stops out of engagement with said carrier end or the active one of said abutments.

2. The combination defined in claim 1 in which said second stop is spaced along said path ahead of the first stop and the first stop, after being retracted out of engagement with said leading carrier end, is maintained inactive during the indexing of said carrier past said second stop.

3. The combination defined in claim 1 in which said second stop is on an arm swingable toward and away from said carrier and biased toward the latter and said first stop is mounted on said arm and yieldably urged relative thereto to a limit position in the path of the carrier.

4. The combination defined in claim 1 including means on the bottom of said carrier for holding said first stop depressed out of blocking engagement with the carrier after the leading wall of the carrier passes the stop.

5. The combination defined in claim 1 in which said first stop is disposed in the vertical center plane of the supported carrier.

6. A machine for unloading successive transverse rows of articles from a carrier in which the articles are supported in upright positions and arranged in parallel longitudinally and transversely extending rows, means supporting said carrier substantially horizontally for indexing along a predetermined path and biasing the same forwardly along such path toward a predetermined unloading position, abutments spaced along said carrier according to the spacing of said transverse rows, an arm extending along and swingable toward and away from said path, stop said arm engageable with said abutments successively to control the step by step advance of the carrier, an actuating lever swingable about an axis parallel to the fulcrum of said stop arm, a link extending between and pivotally connected to the free end of said lever and to said arm and cooperating with the lever to form a toggle adapted to be flexed to retract said stop out of said path and to be straightened to move the stop into the path, spring means normally acting to straighten said toggle, and actuating means for swinging said lever to flex the toggle and retract said stop.

7. An article unloading machine having, in combination, a support, an elongated substantially horizontal conveyor mounted on said support, a tray supported in said conveyor and biased along the latter toward an unloading position, said tray having a plurality of upwardly opening cups supporting articles to be unloaded and arranged in transverse rows uniformly spaced along the conveyor, upright abutments paralleling said rows and spaced along the bottom of said tray according to the spacing of the rows, a stop mounted on said support and yieldably urged upwardly into the path of advance of said abutments for engaging and blocking the same successively whereby to locate the corresponding ones of said rows of cups in said unloading position by step by step indexing of the tray, and means for retracting said stop momentarily below the abutment engaged thereby to first release the tray and permit the same to advance under said biasing force and release the stop for movement into the path of the next one of the abutments.

8. An article unloading machine as defined in claim 7 in which said abutments are disposed above the bottom plane of said tray and said tray bottom is recessed ahead of each of said abutments to receive said stop.

References Cited

UNITED STATES PATENTS 2,572,650  10/1951  Molins.
3,069,035  12/1962  Schwarz _____ 214—309

GERALD M. FORLENZA, Primary Examiner
GEORGE F. ABRAHAM, Assistant Examiner

U.S. Cl. X.R.
198—19; 214—309